United States Patent Office 3,328,493
Patented June 27, 1967

3,328,493
REACTION PRODUCTS OF CHLORAL AND POLY-
ALKYLENE GLYCOL PHOSPHOROUS ESTERS
AND PROCESS THEREOF
Millard S. Larrison, Livingston, N.J., assignor, by mesne
assignments, to Union Carbide Corporation, a corporation of New York
No Drawing. Filed Nov. 14, 1963, Ser. No. 323,603
25 Claims. (Cl. 260—929)

The present invention relates to chloral reaction products.

It has recently been proposed to prepare phosphite and phosphate esters of polyalkylene glycols, and also to make the corresponding phosphonates, e.g., see Friedman Patent 3,009,939, Friedman Patent 3,061,625, Friedman Patent 3,081,331 and Friedman Patent 3,092,651. Such materials are useful in preparing flame-resistant polyurethanes and polyesters.

It is an object of the present invention to prepare novel chloral reaction products.

Another object is to prepare improved flame-resistant polyurethanes and polyesters.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by preparing the chloral products of certain of the phosphites and phosphonates and phosphates set forth in the above-mentioned Friedman patents. The classes of useful materials are set forth hereinafter. When the products of the phosphites are prepared there is a concomitant partial rearrangement to the corresponding phosphonate.

One mole of chloral can be added for each available hydroxyl group. Thus, with tris(dipropylene glycol) phosphite there can be formed (a) the mono chloral product by using 1 mole of chloral for 1 mole of tris(dipropylene glycol) phosphite, or (b) the di chloral product by using 2 moles of chloral for 1 mole of tris(dipropylene glycol) phosphite, or (c) the tri chloral product by using 3 moles of chloral for 1 mole of tris (dipropylene glycol) phosphite, or (d) the sesqui chloral product by using 1.5 moles of chloral for 1 mole of tris(dipropylene glycol) phosphite. More than 3 moles of chloral can be used but this is normally wasteful. Generally, there is no need to form the pure tri product and, hence, slightly less than 3 moles of chloral are employed to give a mixture of the di chloral product and the tri chloral product.

The reaction is normally carried out at moderate temperatures, e.g., between room temperature and 100° C. No catalyst is required for the reaction.

As the starting phosphites and phosphonates there can be used compounds having one of the formulae:

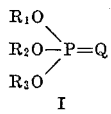

I where $R_1$, $R_2$ and $R_3$ are each the residue of a polyalkylene glycol from which one of the hydroxyl groups has been removed and Q is either oxygen or nothing;

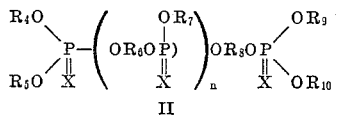

II where $R_4$, $R_5$, $R_7$, $R_9$ and $R_{10}$ are the residues of a polyalkylene glycol from which one of the hydroxyl groups has been removed, $R_6$ and $R_8$ are the residues of a polyalkylene glycol from which the two hydroxyl groups are removed, $n$ is zero or an integer, e.g., 1, 2, 3, 4, 5 or 10, and X is nothing or oxygen;

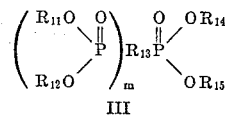

III where $R_{13}$ is selected from the group consisting of hydrocarbon, hydroxyalkyl, hydroxyalkoxyalkyl, hydroxypolyalkoxyalkyl, $R_{11}$, $R_{12}$, $R_{14}$ and $R_{15}$ are selected from the group consisting of hydroxyalkyl, hydroxyalkoxyalkyl, hydroxypolyalkoxyalkyl, $m$ is selected from the group consisting of 0 and 1 when $R_{13}$ is hydrocarbon and $m$ is 0 where $R_{13}$ is other than hydrocarbon; and IV polymers of the compound of Formula III. Illustrative of such polymers of the compounds of Formula III are the phosphonates prepared by the Arbuzov rearrangement with the aid of heat of the polymeric phosphites of Formula II.

Any hydroxyalkyl, hydroxyalkoxyalkyl or hydroxypolyalkoxyalkyl groups are preferably hydroxy lower alkl, hydroxy lower alkoxy lower alkyl and hydroxy lower polyalkoxy lower alkyl groups.

Typical examples of starting compounds are tris(dipropylene glycol) phosphite, tris(tripropylene glycol) phosphite, tris(polypropylene glycol molecular weight 425) phosphite, tris(polypropylene glycol molecular weight 1025) phosphite, tris(polypropylene glycol molecular weight 2025) phosphite, tris(polypropylene glycol molecular weight 4000) phosphite, tris(diethylene glycol) phosphite, tris(triethylene glycol) phosphite, tris(polyethylene glycol 2000 molecular weight) phosphite, tris-(polyethylene glycol 10,000 molecular weight) phosphite, tris(polyalkylene glycol) phosphite wherein the polyalkylene glycol unit is a random mixed ethylene oxide-propylene oxide adduct of molecular weight 2000 containing 60% propylene oxide units, tris(ditetramethylene glycol) phosphite, tris(dibutylene glycol) phosphite, tris-(dipropylene glycol) phosphate, tris(diethylene glycol) phosphate, tris(polypropylene glycol 425) phosphate, dipropylene glycol tetrol diphosphite, dipropylene glycol tetrol diphosphate, diethylene glycol tetrol diphosphite, diethylene glycol tetrol diphosphate, triethylene glycol tetrol diphosphite, tripropylene glycol tetrol diphosphite, polypropylene glycol 425 tetrol diphosphite, dipropylene glycol pentol triphosphite, diethylene glycol pentol triphosphite, polypropylene glycol 2025 pentol triphosphite, dipropylene glycol tetrol diethylene glycol diphosphite (where the 4 hydroxy containing end groups are dipropylene glycol residues and the connecting link between the two phosphorus atoms is the diethylene glycol grouping), bis dipropylene glycol 2-hydroxypropoxypropane phosphonate, bis diethylene glycol hydroxyethoxyethane phosphonate, bis tripropylene glycol 2-hydroxypropoxy- propoxypropane phosphonate, bis polypropylene glycol 2025 ester of hydroxypolypropoxypropane phosphonic acid (wherein the hydroxy polypropoxypropane group has a molecular weight of 2025, bis polyethylene glycol 2000 ester of hydroxypolyethoxyethane phosphonic acid (wherein the hydroxypolyethoxy group has a molecular weight of 2000), bis dibutylene glycol hydroxybutoxybutane phosphonate, bis ditetramethylene glycol hydroxytetramethylene oxybutane phosphonate, bis dipropylene glycol ester of 2-hydroxyethane phosphonic acid, bis diethylene glycol ester of 2-hydroxyethane phosphonic acid, the phosphonate made by Arbuzov rearrangement of dipropylene glycol tetrol diphosphite (the tetrol phosphonate isomeric with dipropylene glycol tetrol diphosphite), the phosphonate made by Arbuzov rearrangement of diethylene glycol tetrol diphosphite, the phosphonate made by Arbuzov rearrangement of tripropylene glycol pentol triphosphite, bis dipropylene glycol methanephosphonate, bis diethylene glycol ethane phosphonate, bis dipropylene glycol butane phosphonate, bis dipropylene glycol benzene phosphonate, bis diethylene glycol toluene phosphonate, bis diethylene glycol hexane phosphonate. There can also be used any of the other compounds within Formulae I, II, III and IV which are set forth in the aforementioned Friedman patents.

In addition to the chloral products of tris(dipropylene glycol) phosphite which have been previously set forth, further illustrative chloral products within the present invention include the mono chloral product of tris(diethylene glycol) phosphite, the di chloral product of tris(diethylene glycol) phosphite, the tri chloral product of tris(diethylene glycol) phosphite, the mono chloral product of bis(dipropylene glycol) hydroxypropoxypropane phosphonate, the di chloral product of bis(dipropylene glycol) hydroxypropoxypropane phosphonate, the tri chloral product of bis(dipropylene glycol) hydroxypropoxypropane phosphonate, the mono chloral product of bis(diethylene glycol) hydroxyethoxyethane phosphonate, the di chloral product of bis(diethylene glycol) hydroxyethoxyethane phosphonate, the tri chloral product of bis(diethylene glycol) hydroxyethoxyethane phosphonate, the mono chloral product of tris(tripropylene glycol) phosphite, the tri chloral product of tris(tripropylene glycol) phosphite, the di chloral product of tris(triethylene glycol) phosphite, the tri chloral product of tris(triethylene glycol) phosphite, the di chloral product of tris(polypropylene glycol 425) phosphite, the mono chloral product of tris(polypropylene glycol 2025) phosphite, the di chloral product of tris(polypropylene glycol 2025) phosphite, the tri chloral product of tris(polypropylene glycol 2025) phosphite, the di chloral product of tris(polypropylene glycol 4000) phosphite, mono chloral product of tris(polyethylene glycol 2000) phosphite, di chloral product of tris(polyethylene glycol 2000) phosphite, tri chloral product of tris(polyethylene glycol 2000) phosphite, tri chloral product of tris(polyethylene glycol 10000) phosphite, di chloral product of tris(ditetramethylene glycol) phosphite, mono chloral product of tris(ditetramethylene glycol) phosphite, tri chloral product of tris(ditetramethylene glycol) phosphite, tri chloral product of tris(dibutylene glycol) phosphite, mono chloral product of tris(dibutylene glycol) phosphite, mono chloral product of tris(dipropylene glycol) phosphate, di chloral product of tris(dipropylene glycol) phosphate, tri chloral product of tris(dipropylene glycol) phosphate, mono chloral product of tris(diethylene glycol) phosphate, di chloral produce of tris(diethylene glycol) phosphate, tri chloral product of tris(diethylene glycol) phosphate, di chloral product of tris(polypropylene glycol 425) phosphate, mono chloral product of dipropylene glycol tetrol diphosphite, di chloral product of dipropylene glycol tetrol diphosphite, tri chloral product of dipropylene glycol tetrol diphosphite, tetra chloral product of dipropylene glycol tetrol diphosphite, tri chloral product of dipropylene glycol tetroldiphosphate, mono chloral product of diethylene glycol tetrol diphosphite, di chloral product of diethylene glycol tetrol diphosphite, tri chloral product of diethylene glycol tetrol diphosphite, tetra chloral product of diethylene glycol tetrol diphosphite, di chloral product of diethylene glycol tetrol diphosphate, trichloral product of tripropylene glycol tetrol diphosphite, di chloral product of polypropylene glycol 425 tetrol diphosphite, mono chloral product of dipropylene glycol pentol triphosphite, tri chloral product of dipropylene pentol triphosphite, penta chloral product of dipropylene glycol pentol triphosphite, di chloral product of diethylene glycol pentol triphosphite, tetra chloral product of diethylene glycol pentol triphosphite, di chloral product of polypropylene glycol 2025 pentol triphosphite, tri chloral product of dipropylene glycol tetrol diphosphite, mono chloral product of bis tri propylene glycol 2-hydroxypropoxypropoxypropane phosphonate, di chloral product of bis polypropylene glycol 2025 ester of hydroxypolypropoxypropane 2025 phosphonic acid, di chloral product of bis polyethylene glycol 2000 ester of hydroxypolyethoxyethane 2000 phosphonic acid, tri chloral product of bis dibutylene glycol hydroxybutoxybutane phosphonate, mono chloral product of bis ditetramethylene glycol hydroxytetramethyleneoxybutane phosphonate, mono chloral product of bis dipropylene glycol ester of 2-hydroxyethane phosphonic acid, di chloral product of bis dipropylene glycol ester of 2-hydroxyethane phosphonic acid, mono chloral product of bis diethylene glycol ester of 2-hydroxyethane phosphonic acid, tri chloral product of bis diethylene glycol ester of 2-hydroxyethane phosphonic acid, mono chloral product of the tetrol phosphonate isomeric with dipropylene glycol tetrol diphosphite, the tetra chloral product of the tetrol phosphonate isomeric with dipropylene glycol tetrol diphosphite, the di chloral product of the tetrol phosphonate isomeric with diethyleneglycol tetrol diphosphite, the tri chloral product of the pentol phosphonate isomeric with dipropylene glycol pentol triphosphite, mono chloral product of bis dipropylene glycol methane phosphonate, di chloral product of bis dipropylene glycol methane phosphonate, di chloral product of bis diethylene glycol methane phosphonate, di chloral product of bis diethylene glycol ethanephosphonate, mono chloral product of bis dipropylene glycol butane phosphonate, di chloral product of bis diethylene glycol pentane phosphonate, mono chloral product of bis dipropylene glycol hexane phosphonate, di chloral product of bis diethylene glycol cyclohexane phosphonate, mono chloral product of bis dipropylene glycol benzene phosphonate, di chloral product of bis dipropylene glycol benzene phosphonate, mono chloral product of bis diethylene glycol benzene phosphonate, di chloral product of bis diethylene glycol benzene phosphonate, di chloral product of bis dipropylene glycol octane phosphonate, di chloral product of bis diethylene glycol toluenephosphonate.

The products of the present invention are useful in making flame and fire resistant polyesters. Thus, they can be heated mole for mole with maleic anhydride, phthalic anhydride, dimethyl terephthalate, fumaric acid and adipic acid to form such polyesters. If desired, a portion of the chloral product of the invention can be replaced by another polyhydric alcohol such as ethylene glycol, glycerine, trimethylolpropane or the like in making such polyesters.

They are also useful as reactive intermediates in forming epoxy resins. They are particularly valuable in forming polyurethanes. The urethane polymers so formed are flame and fire resistant and are useful as linings for textiles, threads, e.g., to make girdles and brassieres, insulation in building construction, upholstery material, carpet underlays, shock absorbing fillings for packages.

Unless otherwise indicated, all parts and percentages are by weight.

The chloral products of tris(diethylene glycol) phosphites are slightly more stable than those from tris(dipropylene glycol) phosphite since the terminal hydroxyl groups in the diethylene glycol compounds are primary whereas the majority of the terminal hydroxyl groups in the dipropylene glycol compounds are secondary. Approximately 90% of the dipropylene glycol hydroxyl groups available in the tris(dipropylene glycol) phosphite used in the specific examples below are secondary hydroxyl groups.

EXAMPLE 1

*Mono chloral product from tris(diethylene glycol) phosphite*

173 grams (0.5 mole) of tris(diethylene glycol) phosphite were placed in a 400 ml. beaker. 73.5 grams (0.5 mole) of chloral were added in the following manner. First, 33.5 grams of chloral were added at room temperature (27° C.) with stirring. There was a very strong exotherm and the temperature rose immediately to 140° C. The beaker and contents were then cooled to 35° C. and 30 grams of additional chloral were added. The temperature rose immediately to 98° C. The beaker contents were cooled to 70° C. and then the remainder of the chloral (10 grams) was added. The temperature rose to 88° C. There was a very slight yellow color in the liquid product. The product had a refractive index of 1.4925, an acid number of 1.4 and a hydroxyl number of 251. The phosphite content was 3.1% calculated as tris(diethylene glycol) phosphite.

EXAMPLE 2

*Mono chloral product from tris(diethylene glycol) phosphite*

12,800 grams (about 37 moles) of tris(diethylene glycol) phosphite having an acid number of 0.12 and a refractive index of 1.4789 were charged into a 22 liter flask on a water bath. There was then added over 1.5 hours an equimolar amount (i.e., about 37 moles) of chloral with stirring while maintaining the temperature below 83° C. The product was a very light yellow fluid of medium viscosity which had an acid number of 1.8 and a hydroxyl number of 340.

In order to maintain a high hydroxyl number in the product it has been found desirable to use a starting phosphite with a low acid number.

EXAMPLE 3

*Di chloral product from tris(diethylene glycol) phosphite*

173 grams (0.5 mole) of tris(diethylene glycol) phosphite were placed in a 400 ml. beaker. Then, 147 grams (1.0 mole) of chloral were added in the following manner. First, 40 grams were added at room temperature (24° C.) in 30 seconds. The temperature rose very rapidly to 145° C. and a very slight yellow color developed. The beaker and contents were cooled to 70° C. and 60 grams more of chloral were added. The temperature rose to 110° C. and the product was next cooled to 60° C. and the remainder of the chloral (47 grams) was added and the temperature rose to 85° C. The product was slightly yellow in color and had an acid number of 2.4.

EXAMPLE 4

*Di chloral product from tris(diethylene glycol) phosphite*

To 919 parts (2.65 moles) of tris(diethylene glycol) phosphite there were added 779 parts (5.3 moles) of commercial chloral in the following manner. 200 parts of chloral were added in 20 seconds and the temperature rose to 165° C. The mixture was cooled to 60° C. and 200 parts more of chloral were added. The temperature rose to 91° C., the mixture cooled to 23° C. and the remainder of the chloral added and the temperature rose to 68° C. The product was a light yellow fluid of medium viscosity. It had an acid number of 3.1 and a hydroxyl number of 340. The product had phosphite content of 6.4%.

EXAMPLE 5

*Tri chloral product from tris(diethylene glycol) phosphite*

173 grams (0.5 mole) of tris(diethylene glycol) phosphite were placed in a 400 ml. beaker. Then, 209 grams (2.85 moles) of chloral were added in the following fashion. First, 30 grams of chloral were added and the temperature rose from 30° to 130° C. The mixture was cooled to 60° C. and 30 grams more of chloral were added. The temperature rose to 110° C. The mixture was cooled again to 60° C. and 30 more grams of chloral were added. The temperature rose to 75° C. The mixture was cooled to 60° C. and the remainder of the chloral was added. The temperature rose to 101° C. The product was a slightly more yellow liquid than the product of Example 3, and had an acid number of 2.6 and a hydroxyl number of 220.

EXAMPLE 6

*Mono chloral product from tris(dipropylene glycol) phosphite*

15,500 grams (36 moles) of tris(dipropylene glycol) phosphite were charged into a 22 liter flask supported on a water bath. There was then added rapidly with efficient agitation 5,540 grams (37.7 moles, a 4.5% excess) of chloral. The temperature rose from 26° C. to 75° C. in 30 minutes with the flask immersed in flowing cold water. The maximum temperature reached during the addition of the chloral was 96° C. All of the chloral was added in 1¼ hours. The final product was a water-white liquid slightly more viscous than tris(dipropylene glycol) phosphite. The product had an acid number of 1.4 and a refractive index of 1.4662 and a hydroxyl number of 219. The phosphite content was 2.0% calculated as tris(dipropylene glycol) phosphite.

EXAMPLE 7

*Mono chloral product from tris(dipropylene glycol) phosphite*

11,200 grams (26 moles) of tris(dipropylene glycol) phosphite were charged into a 22 liter flask supported on a water bath. With good agitation, 4,030 grams (27.4 moles) of chloral were added over a 50 minute period. The temperature was maintained below 100° C. The product was a light yellow fluid of medium viscosity. It had an acid number of 1.5 and a refractive index of 1.4665.

EXAMPLE 8

*Sesqui choral product from tris(dipropylene glycol) phosphite*

14,200 grams (33 moles) of tris(dipropylene glycol) phosphite were charged into a 22 liter flask supported on a water bath and 7,277 grams (49.5 moles) of choral were added with good agitation. Addition of the choral was started with air cooling of the reaction flask. The temperature rose from 28° C. to 85° C. in 15 minutes. Water cooling was then started and the temperature allowed to rise to 98° C. All of the choral was added within 55 minutes from the start of the addition. The temperature was maintained between 85° and 98° C. after the initial 15 minutes and usually was not over 95° C. The product was a light yellow liquid of medium viscosity. It had an acid number of 1.7, a refractive index of 1.4722, a hydroxyl number of 260, chlorine 24.3% and phosphorus 4.8%.

EXAMPLE 9

*Di chloral product from tris(dipropylene glycol) phosphite*

12,900 grams (30 moles) of tris(dipropylene glycol) phosphite were charged into a 22 liter flask supported in a water bath. To this material were added, with efficient agitation and water cooling, 8,820 grams (60 moles) of chloral. The temperature rose from 30° C. to 70° C. in 10 minutes, and was then stabilized by adjusting the flow of the external cooling water and the rate of chloral addition so that the temperature was maintained between 72° and 86° C. The total time for the addition of the chloral was 65 minutes. The liquid product had about 50% more color than that of Example 8, the color shading from orange to yellow. The acid number of the product was 2.6, the phosphite content (calculated as tris(dipropylene glycol) phosphite) was 3.0% and the hydroxyl number 233.

EXAMPLE 10

*Tri chloral product from tris(dipropylene glycol) phosphite*

12,900 grams (30 moles) of tris(dipropylene glycol) phosphite were charged into a 22 liter flask supported in a water bath. To this material were added rapidly with efficient agitation 11,900 grams (81 moles or 90% of the theoretical for tri chloral product formation) of chloral. 2 hours and 20 minutes were required for the addition of chloral. The temperature ranged from 30° C. at the start to a maximum of 85° C. The temperature was kept below 76° C. for most of the reaction. The product was a medium yellow fluid with an acid number of 2.5 and a hydroxyl number of 203.

The strong temperature rise noted at the beginning of the chloral additions in Examples 1–10 is indicative of the very rapid reaction. Later additions of the chloral were less exothermic and similar in intensity to additions of chloral to simple diols such as ethylene glycol or propylene glycol.

The exotherm for tris(diethylene glycol) phosphite is stronger than for tris(dipropylene glycol) phosphite. The diethylene glycol products appear to be more color stable than the corresponding dipropylene glycol products.

EXAMPLE 11

Example 1 was repeated replacing the tris(diethylene glycol) phosphite by 173 grams of bis(diethylene glycol) hydroxyethoxyethane phosphonate to produce a liquid product similar in properties to that of Example 1.

EXAMPLE 12

Example 3 was repeated replacing the tris(diethylene glycol) phosphite by 173 grams of bis(diethylene glycol) hydroxyethoxyethane phosphonate to produce a liquid product similar in properties to that of Example 3.

EXAMPLE 13

Example 5 was repeated replacing the tris(diethylene glycol) phosphite by 173 grams of bis(diethylene glycol) hydroxyethoxyethane phosphonate to produce a liquid product similar in properties to that of Example 5.

EXAMPLE 14

Example 6 was repeated replacing the tris(dipropylene glycol) phosphite by 15,500 grams of bis dipropylene glycol 2-hydroxypropoxypropane phosphonate to produce a liquid product similar in properties to that of Example 6.

EXAMPLE 15

Example 9 was repeated replacing the tris(dipropylene glycol) phosphite by 12,900 grams of bis dipropylene glycol 2-hydroxypropoxypropane phosphonate to produce a liquid product similar in properties to that of Example 9.

EXAMPLE 16

Example 10 was repeated replacing the tris(dipropylene glycol) phosphite by 12,900 grams of bis dipropylene glycol 2-hydroxypropoxypropane phosphonate to produce a liquid product similar in properties to that of Example 10.

It is frequently desirable to utilize a mixture of a bis (polyalkylene glycol) phosphite with tris(polyalkylene glycol) phosphite or the isomeric phosphonate in the chloral reaction. In general, 5 to 95% of the mixture is the bis(polyalkylene glycol) phosphite and 95 to 5% is the tris(polyalkylene glycol) phosphite or corresponding phosphonate. Typical of the bis(polyalkylene glycol) phosphites are bis(diethylene glycol) phosphite and bis (dipropylene glycol) phosphite.

As previously indicated, it is desirable that the acid number of the starting phosphite and the final product be kept low, preferably below 2.

EXAMPLE 17

3,000 grams of commercial tris(dipropylene glycol) phosphite (90% phosphite with the balance being the isomeric phosphonate) were mixed with 113 grams of distilled water. The temperature rose slowly and peaked at about 70° C. in about 1 hour. Several different batches were made using the same amounts of ingredients.

Dipropylene glycol was removed by distillation at 5 mm. pressure from each batch until a total of 900 to 920 grams were collected from each bath. The distillation time for the batches ranged from 30 to 60 minutes. The acid number of the product (distillation residue) ranged from 0.52 to 1.27 in the batches.

The product obtained was a mixture of tris(dipropylene glycol)phosphonate (bis dipropylene glycol hydroxypropoxypropane phosphonate), bis dipropylene glycol phosphite and dipropylene glycol tetrol diphosphite. The primary material in the product was the bis dipropylene glycol phosphite.

This product was combined with redistilled low acid chloral in the following manner.

14,450 grams of the combined residues set forth supra in this example (product containing bis dipropylene glycol phosphite, etc.) was mixed with 6,100 grams of the redistilled chloral during a 40 minute period. The temperature was held below 60° C. by external water cooling. The product was a very light yellow fluid of low viscosity and had an acid number of 1.26. The hydroxyl number of the product was 335. The product of this example gave more stable foams than chloral hemi acetals of bis dipropylene glycol phosphite not containing any of the tris(dipropylene glycol) phosphite or phosphonate.

As previously indicated, the products of the present invention can be reacted with organic polyisocyanates to form polyurethanes. They can be the sole hydroxyl reactant present or they can be used in admixture with other polyhydroxy compounds (polyols) in forming the polyurethanes.

Foamed polyurethanes can be obtained by adding water prior to or simultaneously with the addition of the organic polyisocyanate.

Alternately, foams can be made by uniformly distributing a liquefied fluorine containing haloalkane in either the chloral product or polyisocyanate reactant and then mixing the reactants and permitting the temperature of the mixture to rise during the ensuing reaction above the boiling point of the liquefied gas, e.g., dichlorodifluoromethane, trichlorofluoromethane, dichlorotetrafluoroethane, etc.

Foamed polyurethanes can be made by either the one shot or two step procedure. The polyurethanes prepared according to the invention are solids and can be used in the manner previously indicated.

The unfoamed polyurethanes can be molded into cups and other articles and used to form protective coatings on wood, steel or glass.

As examples of organic polyisocyanates which can be employed to make the polyurethanes there can be employed toluene 2,4-diisocyanate, toluene 2,6-diisocyanate, 4-methoxy-1,3-phenylene diisocyanate, diphenyl methane-4,4'-diisocyanate, 4,4'-methylene bis(phenylisocyanate), naphthalene diisocyanate, hexamethylene diisocyanate, toluene -2,4,6-triisocyanate, the reaction product of toluene diisocyanate with trimethylolpropane at an NCO/OH ratio of 2:1, PAPI which is polymethylene polyphenylisocyanate molecular weight 380 to 400, having an isocyanate equivalent of 135 (maximum), a viscosity of 400 centipoise (maximum) at 750° C., a NCO content of 31% (minimum), an acid value (ppm. of H+) of 200 (maximum), tritolylmethane triisocyanate, 2,4,4'-triisocyanatodiphenyl ether, the reaction product of toluene diisocyanate with trimethylolpropane at an NCO/OH ratio of 2:1 (Mondur CB), the reaction product of toluene diisocyanate with 1,2,6-hexanetriol at an NCO/OH ratio of 2:1; the reaction product of toluene diisocyanate with a polyol phosphite at an NCO/OH ratio of 2:1, e.g., when the polyol phosphite is dipropylene glycol tetrol diphosphite or tris dipropylene glycol phosphite, as well as polyisocyanates listed in Siefken, Annalen, Vol. 562, pages 122–135, (1949), and Saunders et al., "Polyurethanes Chemistry and Technology Part I," pages 156 and 348 (1962).

Alternatively, as the polyisocyanate there can be used a prepolymer made by reacting one of the above polyisocyanates with a polyhydroxy compound. Thus, there can be used prepolymers of toluene diisocyanate and castor oil, toluene diisocyanate and ethylene glycol-propylene glycol-adipate described in Kohrn Patent 2,953,839, Example 1, toluene diisocyanate and polypropylene glycol 2025; toluene diisocyanate and LG–56 (glycerine-propylene oxide adduct having a molecular weight of 3000), etc. Any of the prepolymers and polyisocyanates set forth in Friedman application Ser. No. 145,749, filed Oct. 17, 1961, can be used.

The isocyanates containing 3 or more isocyanate groups are particularly valuable in forming rigid, dimensionally stable, non-burning polyurethanes with the polyol chlorol products of the present invention.

The polyol chloral products of the present invention can be used in admixture with other polyhydroxy compounds in forming the polyurethanes. Examples of such compounds are polyethylene glycols having molecular weight of 400 to 3000, polypropylene glycols having molecular weights of 400 to 3000, ethylene glycol, propylene glycol, dipropylene glycol, diethylene glycol, 1,4-butanediol, glycerol, trimethylolpropane, gycerine-propylene oxide adducts of molecular weights 1000 and 3000, hexanetriol 1,2,6-propylene oxide adducts of molecular weights 750, 1500, 2400 and 4000, pentaerylthritol-propylene oxide adduct of molecular weight 1000, castor oil, N,N,N',N'-tetrakis(2-hydroxyethyl) ethylene diamine, N,N,N',N'-tetrakis(2-hydroxypropyl) ethylene diamine (Quadrol), polyethylene adipate phthalate having free hydroxyl groups, tris dipropylene glycol phosphite, bis dipropylene glycol 2-hydroxypropoxy propane phosphonate as well as the other bis poly lower alkylene glycol hydroxy lower alkoxy lower alkane phosphonates set forth in Friedman Patent 3,092,651.

From 5 to 100% by weight of the hydroxyl component can be the polyol chloral product of the present invention. A product having good non-burning properties can be obtained, for example, by making a polyurethane from a mixture of 10% of the product of Example 5, 15% of bis dipropylene glycol 2-hydroxypropoxypropane phosphonate and 75% of glycerine-propylene oxide adduct molecular weight 3000 with PAPI as the polyisocyanate. The PAPI was used in an amount of 5% over that required to take care of all of the hydroxyl groups on the polyols.

In preparing the polyurethanes there can be used any of the conventional basic catalysts, e.g., N-methyl morpholine, N-ethyl morpholine, tributyl amine, 2-diethylamino-acetamide, Quadrol, N,N'-dimethylpiperazine, and sodium phenolate. There can also be used tin compounds such as stannous octoate, dibutyltin dilaurate, dibutyltin diacetate, tributyltin laurate, dibutyltin ethoxide, octylstannoic acid, triphenyltin hydride, dibutyltin oxide, etc. There can be used any of the basic compound and tin compounds set forth in Friedman application Ser. No. 145,749.

Conventional surfactants can be added in the amount of 1% or less. The preferred surfactants are silicones, e.g., polydimethyl siloxanes having a viscosity of 3 to 100 centistokes, triethoxydimethyl polysiloxane molecular weight 850 copolymerized with a dimethoxypolyethylene glycol of molecular weight 750 as well as any of the other siloxanes disclosed in Hostettler French Patent 1,212,252.

In the following examples there was employed the following standard formulation:

| | Grams |
|---|---|
| Water | 0.37 |
| Dibutyl tin dilaurate | 0.07 |
| Polydimethyl siloxane (50 centistokes) | 0.12 |
| N-ethyl morpholine | 0.1 |

This mixture is designated in the following examples as Formulation A.

In the examples the toluene diisocyanate employed was a mixture of 80% of the 2,4 isomer and 20% of the 2,6 isomer. The foams were then cured in a 110° C. oven for about 20 minutes.

EXAMPLE 18

The polyol used in Formulation A was a mixture of 1.5 grams of the product of Example 1 and 7 grams of polypropylene glycol 2025. Upon addition of 5.2 grams of toluene diisocyanate there was produced a rigid, solid, non-burning foam.

EXAMPLE 19

The polyol used in Formulation A was a mixture of 1.1 grams of the product of Example 2 and 7 grams of LG–56 (glycerine-propylene oxide adduct molecular weight 3000). Upon addition of 5.2 grams of toluene diisocyanate there was produced a rigid, solid, non-burning foam.

EXAMPLE 20

The polyol used in Formulation A was a mixture of 1.65 grams of the product of Example 4 and 3.5 grams of LG–56. Upon addition of 5.2 grams of toluene diisocyanate there was produced a rigid, non-burning foam of good dimensional stability.

EXAMPLE 21

The polyol used in Formulation A was a mixture of 2.7 grams of the product of Example 4 and 3.5 grams of LG–56. Upon addition of 5.2 grams of toluene diisocyanate there was produced a rigid, non-burning foam of good dimensional stability.

EXAMPLE 22

The polyol used in Formulation A was 3.6 grams of the product of Example 4. Upon addition of 5.2 grams of toluene diisocyanate there was produced a rigid, non-burning foam of good dimensional stability.

EXAMPLE 23

The polyol used in Formulation A was a mixture of 1.8 grams of the product of Example 6 and 7 grams of LG–56. Upon addition of 5.2 grams of toluene diisocyanate there was produced a rigid, non-burning, solid foam of good dimensional stability.

EXAMPLE 24

The polyol used in Formulation A was a mixture of 1.4 grams of the product of Example 8 and 7 grams of polypropylene glycol 2025. Upon addition of 5.2 grams of toluene diisocyanate there was produced a rigid, non-burning foam of good stability.

EXAMPLE 25

The polyol used in Formulation A was a mixture of 1.5 grams of the product of Example 9 and 7 grams of LG–56. Upon addition of 5.2 grams of toluene diisocyanate there was produced a solid, non-burning foam.

EXAMPLE 26

The polyol used in Formulation A was a mixture of 2.5 grams of the product of Example 10 and 4.7 grams of LG–56. Upon addition of 5.2 grams of toluene diisocyanate there was produced a solid, non-burning foam.

EXAMPLE 27

The polyol used in Formulation A was a mixture of 1.9 grams of the product of Example 16 and 17 grams of LG–56. Upon addition of 5.2 grams of toluene diisocyanate there was produced a solid, non-burning foam.

EXAMPLE 28

The polyol used in Formulation A was a mixture of 1.2 grams of the product of Example 17 and 7 grams of LG–56. Upon addition 5.2 grams of toluene diisocyanate there was produced a solid, non-burning foam.

The products of Examples 1, 2, 4, 6, 8, 9, 10, 16 and 17 were also foamed on a moving belt by the addition of toluene diisocyanate and dichlorodifluoromethane. The toluene diisocyanate was employed in an amount equivalent to the hydroxyl groups present +5%.

What is claimed is:

1. The organic reaction product of chloral with a phosphorus of the group consisting of (a) 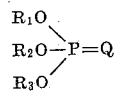

(b) 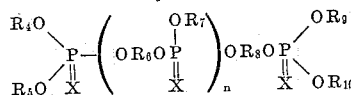

(c) 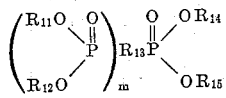

(d) and polymers of (c) where $R_1$, $R_2$, $R_3$, $R_4$, $R_5$, $R_7$, $R_9$ and $R_{10}$ are the residues of a polyalkylene glycol from which one of the hydroxyl groups has been removed, $R_6$ and $R_8$ are the residues of a polyalkylene glycol from which the two hydroxyl groups are removed, $R_{11}$, $R_{12}$, $R_{14}$ and $R_{15}$ are selected from the group consisting of hydroxyalkyl, hydroxyalkoxyalkyl and hydroxypolyalkoxyalkyl, $R_{13}$ is selected from the group consisting of hydrocarbon, hydroxyalkyl, hydroxyalkoxyalkyl, and hydroxypolyalkoxyalkyl, X and Q are either oxygen or nothing, $n$ is selected from the group consisting of zero and an integer and $m$ is selected from the group consisting of 0 and 1 when $R_{13}$ is hydrocarbon and $m$ is 0 when $R_{13}$ is other than hydrocarbon and the amount of chloral being between one mol per mol of phosphorus compound and one mol of chloral for each available hydroxyl group on the phosphorus compound.

2. A product according to claim 1 including only 1 chloral unit per molecule.

3. A product according to claim 1 including 2 to 3 chloral units per molecule.

4. A product according to claim 1 which is the reaction product of chloral with a tris(polyalkylene glycol) monophosphite.

5. A product according to claim 4 including only 1 chloral unit per molecule.

6. A product of chloral according to claim 4 including 2 to 3 chloral units per molecule.

7. Mono chloral organic reaction product with tris(diethylene glycol) phosphite.

8. Di chloral organic reaction product with tris(diethylene glycol) phosphite.

9. Tri chloral organic reaction product with tris(diethylene glycol) phosphite.

10. Mono chloral organic reaction product with tris(dipropylene glycol) phosphite.

11. Di chloral organic reaction product with tris(dipropylene glycol) phosphite.

12. Tri chloral organic reaction product with tris(dipropylene glycol) phosphite.

13. Mono chloral organic reaction product with bis(diethylene glycol) hydroxyethoxyethane phosphonate.

14. Di to tri chloral organic reaction products with bis(diethylene glycol) hydroxyethoxyethane phosphonate.

15. Mono chloral organic reaction product with bis(dipropylene glycol) hydroxypropoxypropane phosphonate.

16. Di to tri chloral organic reaction products with bis(dipropylene glycol) hydroxypropoxypropane phosphonate.

17. A method of producing an organic reaction product comprising reacting 1.5 to 3 moles of chloral with 1 mole of a tris(poly lower alkylene glycol) phosphite.

18. A method of producing an organic reaction product comprising reacting 1.5 to 3 moles of chloral with 1 mole of tris(diethylene glycol) phosphite.

19. A method of producing an organic reaction product comprising reacting 1.5 to 3 moles of chloral with 1 mole of tris(dipropylene glycol) phosphite.

20. The organic reaction product of chloral with a polyalkylene glycol polyol polyphosphite having two more hydroxyl groups than phosphorus atoms, said product having been prepared according to claim 1.

21. The organic reaction product of chloral with a polyalkylene glycol tetrol diphosphite prepared according to claim 1.

22. The organic reaction product of chloral with a dialkylene glycol tetrol diphosphite having 2 to 3 carbon atoms in the alkylene groups prepared according to claim 1.

23. A method of producing an organic reaction product comprising reacting 1 mole of chloral with 1 mole of tris(diethylene glycol) phosphite.

24. A method of producing an organic reaction product comprising reacting 1 mole of chloral with 1 mole of tris(dipropylene glycol) phosphite.

25. The process of preparing the product of claim 1 comprising reacting chloral with a member of the group consisting of (a), (b), (c), (d) and polymers of (c).

References Cited

UNITED STATES PATENTS

| | | | |
|---|---|---|---|
| 2,701,225 | 2/1955 | Lorenz | 167—22 |
| 3,131,206 | 4/1964 | Friedman | 260—929 |
| 3,265,681 | 8/1966 | Friedman | 260—953 |

CHARLES B. PARKER, *Primary Examiner.*

B. BILLIAN, *Assistant Examiner.*